US012688546B2

(12) United States Patent
Hsiao

(10) Patent No.: US 12,688,546 B2
(45) Date of Patent: Jul. 21, 2026

(54) IMAGE PROCESSING DEVICE AND IMAGE PROCESSING METHOD FOR RENDERING IMAGES

(71) Applicant: Cupola360 INC., Hsinchu City (TW)

(72) Inventor: Chia-Wei Hsiao, Hsinchu City (TW)

(73) Assignee: Cupola360 INC., Hsinchu City (TW)

( * ) Notice: Subject to any disclaimer, the term of this patent is extended or adjusted under 35 U.S.C. 154(b) by 288 days.

(21) Appl. No.: 18/608,942

(22) Filed: Mar. 19, 2024

(65) Prior Publication Data

US 2025/0265802 A1 Aug. 21, 2025

(30) Foreign Application Priority Data

Feb. 19, 2024 (TW) ................................. 113105699

(51) Int. Cl.
*G06T 7/11* (2017.01)
*G06T 11/60* (2006.01)
*G06V 10/25* (2022.01)

(52) U.S. Cl.
CPC ................. *G06V 10/25* (2022.01); *G06T 7/11* (2017.01); *G06T 11/60* (2013.01)

(58) Field of Classification Search
CPC ........... G06V 10/25; G06T 7/11; G06T 11/60; G06T 11/00; G06T 15/005; G06T 1/60; G06T 17/00
See application file for complete search history.

(56) References Cited

U.S. PATENT DOCUMENTS

| | | | |
|---|---|---|---|
| 10,104,288 B2 | 10/2018 | Hung et al. | |
| 2018/0227484 A1* | 8/2018 | Hung | G06T 3/18 |
| 2019/0235917 A1* | 8/2019 | Koneru | G06F 9/4843 |

(Continued)

FOREIGN PATENT DOCUMENTS

| | | |
|---|---|---|
| CN | 103533364 | 1/2014 |
| CN | 108293136 | 7/2018 |

(Continued)

OTHER PUBLICATIONS

Wang et al, Real-time environment map interpolation, 2004, 3rd International Conference on Image and Graphics, pp. 1-9. (Year: 2004).*

(Continued)

*Primary Examiner* — Kathleen M Broughton
(74) *Attorney, Agent, or Firm* — JCIPRNET

(57) ABSTRACT

An image processing device and an image processing method for rendering images are provided. The method includes: dividing a layout in layout information to obtain a first region of interest (ROI) corresponding to a first processing unit and a second ROI corresponding to a second processing unit; performing a first interpolation operation according to a first data structure using the first processing unit to generate a third data structure corresponding to a third vertex of the first ROI; performing a second interpolation operation according to a second data structure using the second processing unit to generate a fourth data structure corresponding to a fourth vertex of the second ROI; updating a vertex list according to the third data structure and the fourth data structure to generate a composed vertex list; and mapping an input image to the layout according to the composed vertex list to generate an output image.

9 Claims, 7 Drawing Sheets

(56)        References Cited

U.S. PATENT DOCUMENTS

2020/0286206 A1*  9/2020  Lu ............................. G06T 3/20
2021/0183145 A1*  6/2021  Toschi ................... G06T 17/20
2023/0394622 A1   12/2023  Lu
2024/0202868 A1*  6/2024  Hsiao ..................... G06T 11/60

FOREIGN PATENT DOCUMENTS

CN        113155147       7/2021
CN        115861517       3/2023
CN        116090040       5/2023
TW        I829475         1/2024

OTHER PUBLICATIONS

"Office Action of Taiwan Counterpart Application", issued on Jul.
23, 2024, p. 1-p. 11.

* cited by examiner 120     110     130

Processing
device

Storage medium

Processing unit — 111

Processing unit — 112

Transceiver

100

Output image

A     B     — 500

C

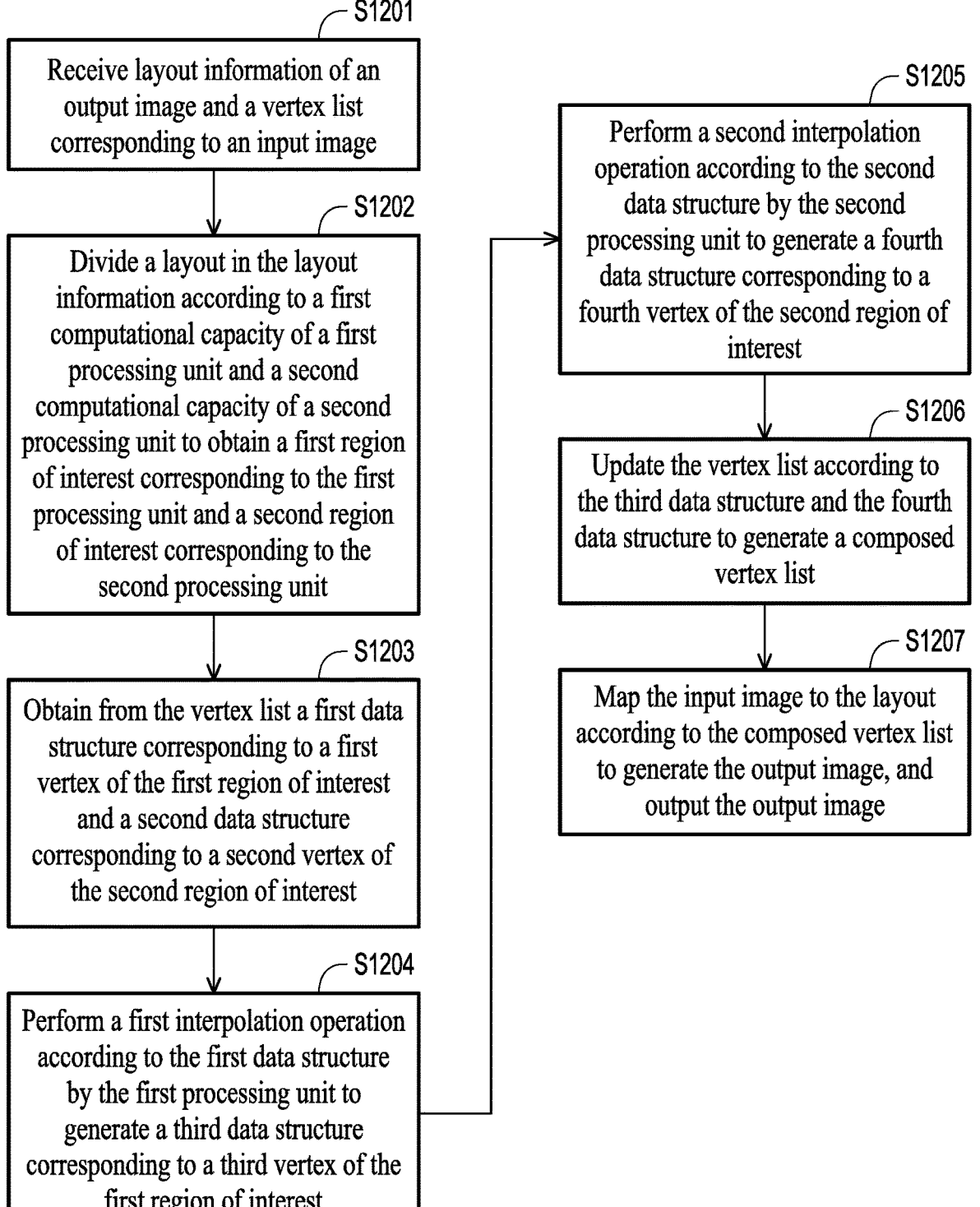

S1201
Receive layout information of an output image and a vertex list corresponding to an input image S1202
Divide a layout in the layout information according to a first computational capacity of a first processing unit and a second computational capacity of a second processing unit to obtain a first region of interest corresponding to the first processing unit and a second region of interest corresponding to the second processing unit S1203
Obtain from the vertex list a first data structure corresponding to a first vertex of the first region of interest and a second data structure corresponding to a second vertex of the second region of interest S1204
Perform a first interpolation operation according to the first data structure by the first processing unit to generate a third data structure corresponding to a third vertex of the first region of interest S1205
Perform a second interpolation operation according to the second data structure by the second processing unit to generate a fourth data structure corresponding to a fourth vertex of the second region of interest S1206
Update the vertex list according to the third data structure and the fourth data structure to generate a composed vertex list S1207
Map the input image to the layout according to the composed vertex list to generate the output image, and output the output image

FIG. 12

IMAGE PROCESSING DEVICE AND IMAGE PROCESSING METHOD FOR RENDERING IMAGES

CROSS-REFERENCE TO RELATED APPLICATION

This application claims the priority benefit of Taiwan application serial no. 113105699, filed on Feb. 19, 2024. The entirety of the above-mentioned patent application is hereby incorporated by reference herein and made a part of this specification.

BACKGROUND

Technical Field

The disclosure relates to an image processing technology, and particularly relates to an image processing device and an image processing method for rendering images.

Description of Related Art

The US Patent Publication No. "U.S. Pat. No. 10,104, 288" discloses a panoramic image generation method and device with a joining function, which may convert camera images into panoramic images using a data structure defined by a vertex list. However, the above-mentioned patent may only output a single panoramic image. Currently, there are many software (such as video conferencing software or surveillance systems) that need to output various layouts, and various images need to be displayed in one layout. For example, the layout of video conferencing software needs to display a plurality of images including different participants. Since the above-mentioned patent may only output a single panoramic image, it cannot meet diverse layout requirements. In addition, the process of rendering an image using a vertex list may take a lot of time. Therefore, how to speed up the rendering of the image is one of the important topics in this field.

SUMMARY

The disclosure provides an image processing device and an image processing method for rendering images, which may simultaneously perform interpolation operations for rendering images using a plurality of processing units to accelerate the image processing process.

The disclosure provides an image processing device for rendering images, including a processing device, a storage medium, and a transceiver. The transceiver receives layout information of an output image and a vertex list corresponding to an input image. The storage medium stores a plurality of modules. The processing device includes a first processing unit and a second processing unit. The processing device is coupled to the storage medium and the transceiver, and accesses and executes the plurality of modules. The plurality of modules include a real-time composer and an image processing module. The real-time composer is configured to: divide a layout in the layout information according to a first computational capacity of the first processing unit and a second computational capacity of the second processing unit to obtain a first region of interest corresponding to the first processing unit and a second region of interest corresponding to the second processing unit; obtain from the vertex list a first data structure corresponding to a first vertex of the first region of interest and a second data structure corresponding to a second vertex of the second region of interest; perform a first interpolation operation according to the first data structure using the first processing unit to generate a third data structure corresponding to a third vertex of the first region of interest; perform a second interpolation operation according to the second data structure using the second processing unit to generate a fourth data structure corresponding to a fourth vertex of the second region of interest; and update the vertex list according to the third data structure and the fourth data structure to generate a composed vertex list. The image processing module maps the input image to the layout according to the composed vertex list to generate the output image, and outputs the output image through the transceiver.

In an embodiment of the disclosure, the real-time composer is further configured to: calculate a first weight of the first processing unit and a second weight of the second processing unit according to the first computational capacity and the second computational capacity, in which the first weight is proportional to the first computational capacity; calculate a first height corresponding to the first region of interest according to the first weight and the second weight; and divide the layout according to the first height to obtain the first region of interest.

In an embodiment of the disclosure, the real-time composer is further configured to: update the first weight according to an execution time of the first interpolation operation.

In an embodiment of the disclosure, the first interpolation operation corresponds to a current frame of the input image. The real-time composer is further configured to: input a ratio of the first height to the execution time and a third weight corresponding to a previous frame of the input image to an infinite impulse response filter to update the first weight, in which the third weight corresponds to the first processing unit.

In an embodiment of the disclosure, the real-time composer is further configured to: store a plurality of data structures corresponding to a plurality of vertices of the first region of interest in a first storage area of the storage medium, in which the plurality of data structures include the first data structure; generate a first address table corresponding to the first storage area; and perform the first interpolation operation according to the first address table using the first processing unit to generate the third data structure, and store the third data structure in the first storage area.

In an embodiment of the disclosure, the real-time composer is further configured to: combine the first address table corresponding to the first storage area and a second address table corresponding to a second storage area in the storage medium to produce the composed vertex list, in which the second storage area corresponds to the second region of interest.

In an embodiment of the disclosure, the layout information includes coordinates, a width, and a height corresponding to the region of interest of a source image and includes coordinates, a width, and a height corresponding to a display area of a target image.

In an embodiment of the disclosure, the real-time composer is further configured to: obtain a correction map corresponding to the input image through the transceiver, in which the vertex list includes the first vertex on the correction map; divide the first region of interest into a plurality of tiles including a first tile, and map a sub-block of the first tile to the correction map to obtain a mapping area; and in response to the third vertex in the mapping area corresponding to the first vertex, perform the first interpolation operation according to the first data structure to generate the third data structure.

An image processing method for rendering images of the disclosure includes the following steps. Layout information of an output image and a vertex list corresponding to an input image are received. Layout in the layout information is divided according to a first computational capacity of a first processing unit and a second computational capacity of a second processing unit to obtain a first region of interest corresponding to the first processing unit and a second region of interest corresponding to the second processing unit. A first data structure corresponding to a first vertex of the first region of interest and a second data structure corresponding to a second vertex of the second region of interest are obtained from the vertex list. A first interpolation operation is performed according to the first data structure by the first processing unit to generate a third data structure corresponding to a third vertex of the first region of interest. A second interpolation operation is performed according to the second data structure by the second processing unit to generate a fourth data structure corresponding to a fourth vertex of the second region of interest. The vertex list is updated according to the third data structure and the fourth data structure to generate a composed vertex list. The input image is mapped to the layout according to the composed vertex list to produce the output image, and the output image is output.

According to the above, the image processing device of the disclosure may simultaneously perform image processing for a plurality of regions of interest in the layout using a plurality of processing units, thereby reducing the time required to render the output image.

BRIEF DESCRIPTION OF THE DRAWINGS

FIG. 12 is a flowchart of an image processing method for rendering images according to an embodiment of the disclosure.

DESCRIPTION OF THE EMBODIMENTS

Figure 1:
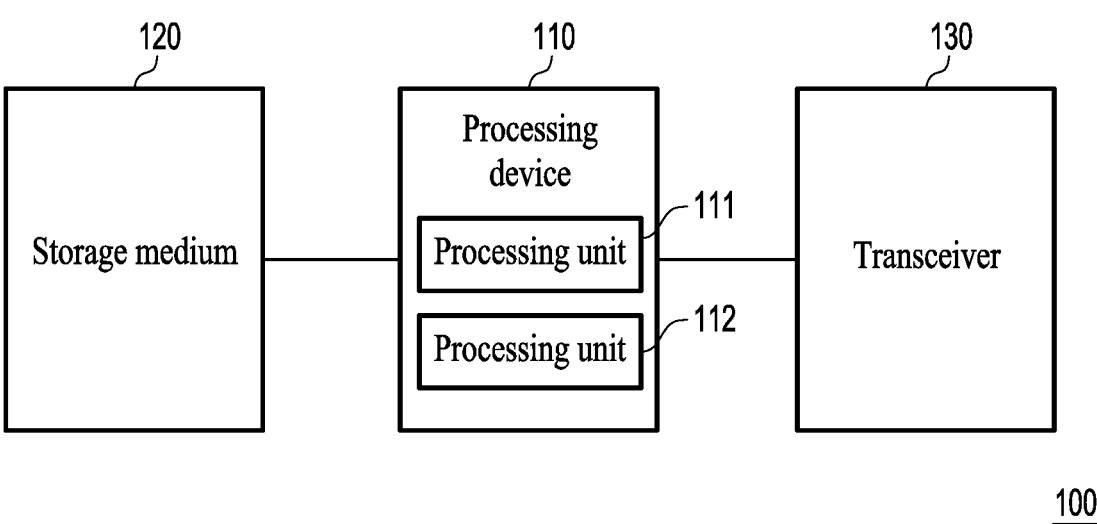
FIG. 1 is a schematic diagram of an image processing device for rendering images according to an embodiment of the disclosure.

FIG. 1 is a schematic diagram of an image processing device 100 for rendering images according to an embodiment of the disclosure. The image processing device 100 may include a processing device 110, a storage medium 120, and a transceiver 130.

The processing device 110 may include K processing units (K is a positive integer greater than 1), and each processing unit has corresponding computational capacity. For example, the processing device 110 may include a processing unit 111 and a processing unit 112. The processing device 110 is, for example, a central processing unit (CPU), or other programmable general-purpose or special-purpose micro control units (MCUs), a microprocessor, a digital signal processor (DSP), a programmable controller, an application specific integrated circuit (ASIC), a graphics processing unit (GPU), an image signal processor (ISP)), an image processing unit (IPU), an arithmetic logic unit (ALU), a complex programmable logic device (CPLD), a field programmable gate array (FPGA), or other similar elements, or a combination thereof. The processing device 110 may be coupled to the storage medium 120 and the transceiver 130, and access and execute a plurality of modules and various application programs stored in the storage medium 120.

The storage medium 120 is, for example, any form of fixed or movable random access memory (RAM), a read-only memory (ROM), a flash memory, a hard disk drive (HDD), a solid state drive (SSD), or a similar element, or a combination thereof, configured to store the plurality of modules or the various application programs that may be executed by the processing device 110.

The transceiver 130 transmits and receives signals in a wireless or wired manner. Transceiver 130 may also perform, for example, low noise amplification, impedance matching, mixing, up or down frequency conversion, filtering, amplification, and similar operations.

Figure 2:
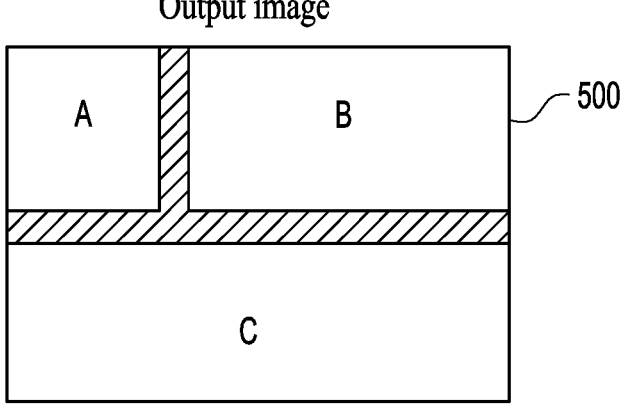
FIG. 2 is a schematic diagram of a layout corresponding to an output image according to an embodiment of the disclosure.

The image processing device 100 may generate an output image corresponding to a layout according to the user's requirements for the layout, as shown in FIG. 2. In FIG. 2, a layout 500 of the output image may include a plurality of display areas such as a display area A, a display area B, and a display area C, and different display areas may respectively display the same or different regions of interest in an input image. For example, assuming that the layout 500 is the layout of remote conferencing software, the display area A, the display area B, and the display area C may respectively display images of different participants such as a user A, a user B, and a user C. Assuming that the user A and the user C use the same photography device and the user B uses a different photography device, then the user A's image and the user C's image may respectively correspond to different regions of interest of the same input image, and the user B's image may correspond to regions of interest of different input images.

Figure 3:
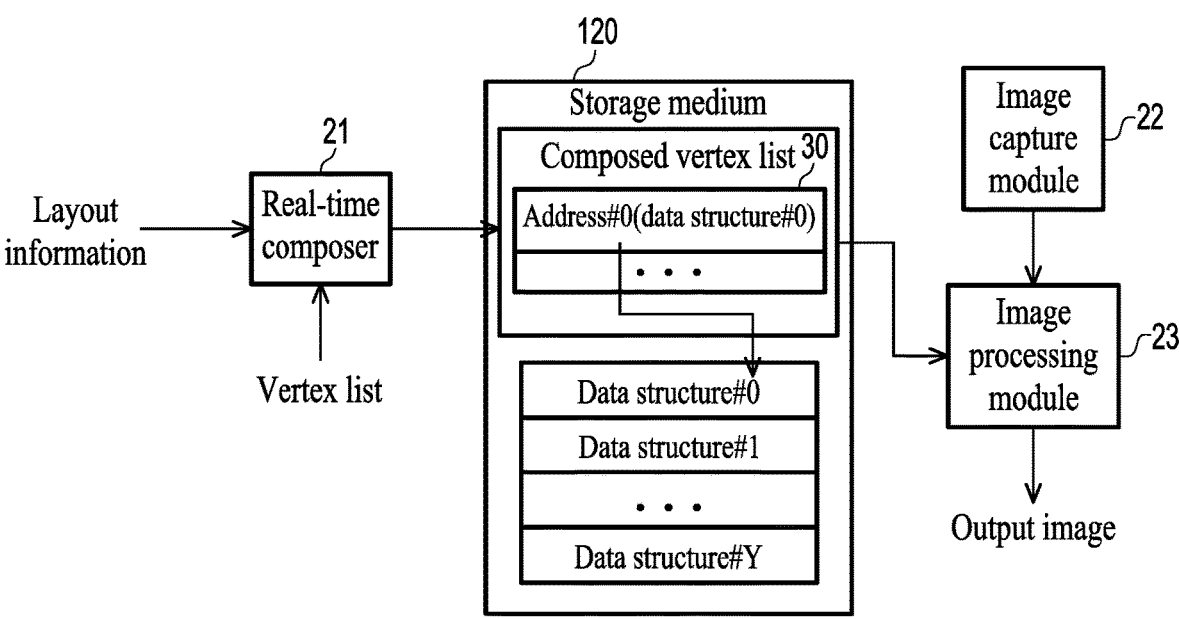
FIG. 3 is a schematic diagram of a plurality of modules of an image processing device according to an embodiment of the disclosure.

FIG. 3 is a schematic diagram of the plurality of modules of the image processing device 100 according to an embodiment of the disclosure. The processing device 110 may access and execute the plurality of modules in the storage medium 120 to perform various functions of the image processing device 100. In the embodiment, the plurality of modules stored in the storage medium 120 may include a plurality of modules such as a real-time composer 21, an image capture module 22, and an image processing module 23.

The real-time composer 21 may receive layout information corresponding to the output image and a vertex list corresponding to the input image through the transceiver 130, and generate a composed vertex list 30 according to the layout information and the vertex list. For the method of generating the vertex list of the input image, please refer to the contents recorded in the US Patent Publication No. "U.S. Pat. No. 10,104,288". The image capture module 22 may receive an original image through the transceiver 130 and generate the input image. Specifically, the image capture module 22 may be communicatively connected to one or more image capture devices through the transceiver 130, and then receive from the one or more image capture devices the original image that may be configured to generate an equirectangular projection image. On the other hand, the image capture module 22 may be communicatively connected to one or more electronic devices through the transceiver 130 to receive other types of original images that are not configured to generate the equirectangular projection image. The input image may include the equirectangular projection image converted from the original image obtained by the image capture module 22 or other types of images converted from the original image obtained by the image capture module 22. In an embodiment, the processing device 110 may generate the corresponding vertex list according to the input image from the image capture module 22, as described in US Patent Publication No. "U.S. Pat. No. 10,104,288". In an embodiment, a single input image may include one or more textures, where the texture is, for example, a camera image (i.e., the original image). For example, the equirectangular projection image as the input image may be spliced from a plurality of camera images (or equirectangular projection images obtained by converting camera images) captured by a plurality of cameras. Therefore, the input image may include a plurality of textures.

The vertex list records a plurality of vertices and a plurality of data structures corresponding to the plurality of vertices. After obtaining the vertex list, the processing device 110 may generate a correction map corresponding to the input image according to an original vertex list. For example, if the resolution of the input image is 1920×1080, the processing device 110 may generate a correction map corresponding to the resolution of 1920×1080. The vertex list may include a mapping relationship between the input image and the layout 500 (or the output image), and may be configured to map a specific input image to a specific display area in the layout 500 (e.g., the display areas A, B, or C).

Figure 8:
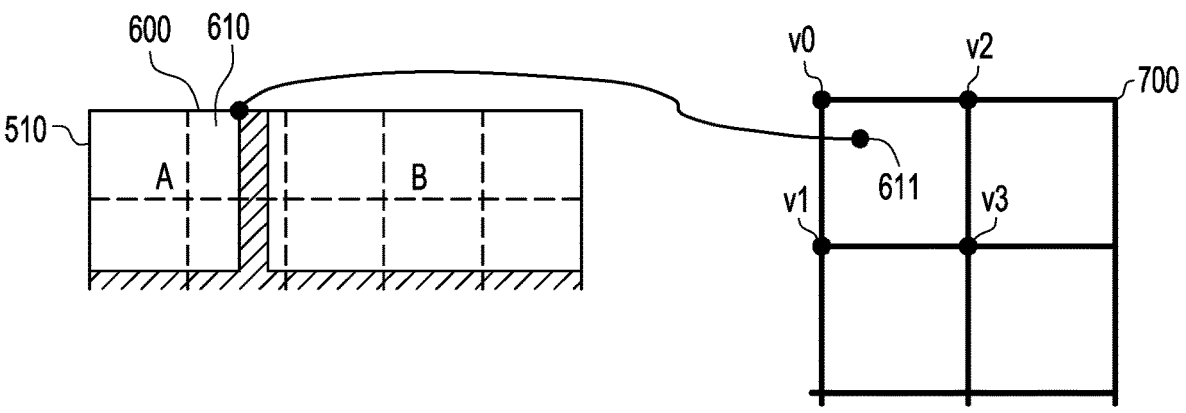
FIG. 8 is a schematic diagram of performing an interpolation operation according to an embodiment of the disclosure.

Table 1 is an example of the information included in the vertex list, where the vertex list (or a correction map 700 as shown in FIG. 8) is assumed to contain N vertices. The memory address of the data structure in Table 1 may point to the data structure of a specific vertex. Table 2 is an example of the data structure of the vertices of the correction map 700, in which each attribute in Table 1 and Table 2 may be obtained from the vertex list. The US Patent Publication No. "U.S. Pat. No. 10,104,288" records a specific implementation method of rendering the input image according to the data structure of the vertices to generate the output image.

TABLE 1

| Attribute | Description |
|---|---|
| id | An identifier of an input image corresponding to a correction map |
| v[0].(u, v) | Coordinates of a vertex v0 in a correction map |
| v[0]. vertex_ptr[ ] | A memory address of a data structure of a vertex v0 |
| . . . | . . . |
| v[N].(u, v) | Coordinates of a vertex vN in a correction map |
| v[N]. vertex_ptr[ ] | A memory address of a data structure of a vertex vN |

TABLE 2

| Attribute | Description |
|---|---|
| ntex | Number of textures (i.e., source images) corresponding to the vertex (if the vertex is close to a splicing area of a plurality of source images, the vertex may correspond to a plurality of textures) |
| tex_id | Texture identifier |
| (u, v) | Coordinates of a vertex |
| alpha | Blend weighting for textures |
| sca_id1 | An identifier of a first overlapping control area in an input image (a scaling factor pointing to the first overlapping control area) |
| sca_blend1 | Blend weighting of a first overlapping control area |
| sca_id2 | An identifier of a second overlapping control area in an input image (a scaling factor pointing to the second overlapping control area) |
| sca_blend2 | Blend weighting of a second overlapping control area |
| . . . | . . . |
| sca_idm | An identifier of the mth overlapping control area in an input image. (a scaling factor pointing to the mth overlapping control area) |
| sca_blendm | Blend weighting of the mth overlapping control area |
| scaling coefficient | Scaling coefficient |

Figure 4:
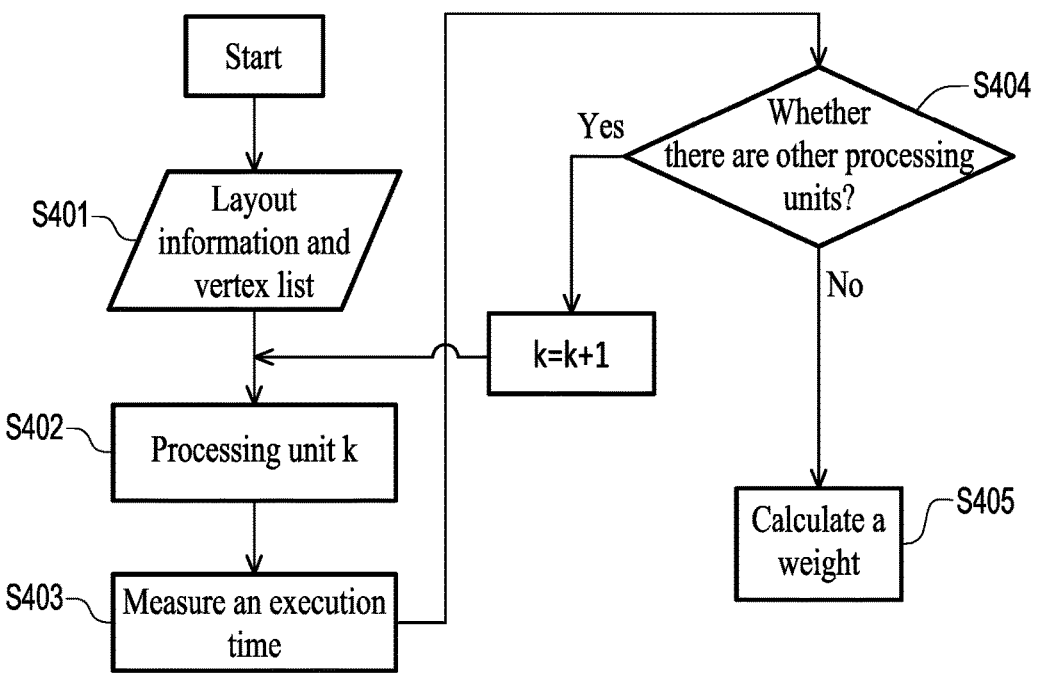
FIG. 4 is a flowchart of calculating weights of processing units according to an embodiment of the disclosure.

In order to accelerate the rendering of the output image, the processing device 110 allocates computational tasks for the processing units according to the computational capacities and weights of the processing units. A plurality of processing units may simultaneously perform computational tasks to reduce the time required to render the output image. FIG. 4 is a flowchart of calculating weights of processing units according to an embodiment of the disclosure.

In step S401, the real-time composer 21 may receive the layout information of the output image and the vertex list corresponding to the input image through the transceiver 130.

The layout information may include the mapping relationship between the source image (i.e., the input image) and the target image (i.e., the output image). Specifically, the processing device 110 may obtain a region of interest (ROI) window descriptor from the layout information. Table 3 is an example of the ROI window descriptor. The processing device 110 may obtain relevant information of one or more display areas from the ROI window descriptor, and determine the layout 500 shown in FIG. 2 according to the information. For example, the position and size of the display area (e.g., the display areas A, B, or C) may be determined according to the attribute "(dst_x, dst_y)" and the attribute "(dst_w, dst_h)". It is worth noting that although the example in Table 3 only records the mapping relationship between a set of ROI windows in the source image and the display area in the target image, the ROI window descriptor may also include a plurality of sets of mapping relationships. In other words, the user may define a plurality of ROI windows on one or more input images, or may define a plurality of display areas on the output image (or the layout 500). The projection methods in Table 3 may include, but are not limited to, rendering methods such as perspective projection, linear crop projection, or homograph transform. The linear crop projection may be applied to crop and scale an equirectangular projection image to produce the output image with a larger viewing angle.

In step S404, the real-time composer 21 may determine whether there are other processing units that have not been selected (i.e., processing units whose execution time has not been measured). If there is a processing unit that has not been selected, the processing device 110 sets k=k+1 and performs step S402 again. If the execution time of all processing units has been measured, step S405 is entered.

In step S405, the real-time composer 21 may calculate the initial weight of the processing unit according to the execution time (or the computational capacity) of the processing unit. The weight of a processing unit may be directly proportional to the computational capacity of the processing unit, or may be inversely proportional to the execution time of the processing unit. In an embodiment, the processing device 110 may calculate the initial weight of the processing unit according to formula (1), where $M_k[0]$ is the initial weight of processing unit k, K is the number of processing units (for example: K=2), $T0_i$ is the execution time spent by the i-th processing unit to execute the preset computational task, and $T0_k$ is the execution time spent by processing unit k to execute the preset computational task.

$$M_k[0] = \frac{\sum_{i=1}^{K} T0_i}{T0_k} \tag{1}$$

Figure 5:
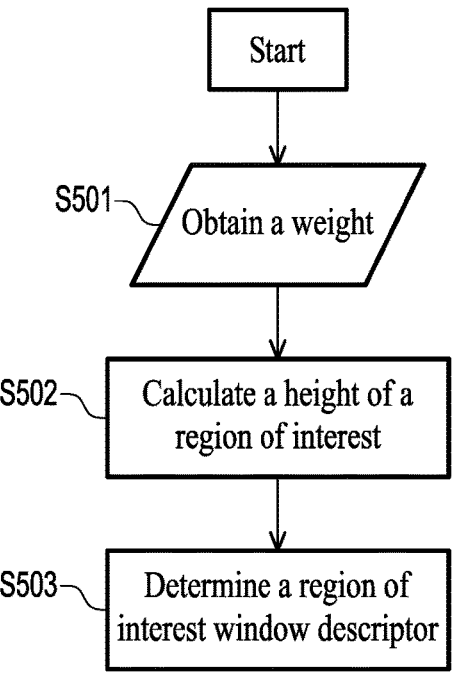
FIG. 5 is a flowchart of determining a region of interest window descriptor according to an embodiment of the disclosure.

FIG. 5 is a flowchart of determining a region of interest window descriptor according to an embodiment of the disclosure. In step S501, the real-time composer 21 may obtain the weight of each processing unit.

In step S502, the real-time composer 21 may calculate the height of the region of interest corresponding to the processing unit according to the weight of the processing unit, as shown in formula (2), where $L_k[n]$ represents the height of the region of interest corresponding to processing unit k, n represents the time index (or the frame index of the input image), $M_k[n]$ is the weight corresponding to frame n of the

TABLE 3

| Attribute | Description |
|---|---|
| win_id | An identifier of an ROI window in a source image |
| (src_x, src_y) | Coordinates of an origin (upper left point) of an ROI window in a source image |
| (src_w, src_h) | A width and a height of an ROI window in a source image |
| (dst_x, dst_y) | Coordinates of an origin (upper left point) of a display area in a target image |
| (dst_w, dst_h) | A width and a height of a display area in a target image |
| projection | Projection method |
| src_domain_id | Domain of a source image (indicating that the source image comes from the image capture module 21) |

In step S402, the real-time composer 21 may select a processing unit k, where k is the index of the processing unit. For example, k=1 represents the processing unit 111, and k=2 represents the processing unit 112, where the initial value of k may be 1.

In step S403, the real-time composer 21 may measure the execution time required by the processing unit k to perform a preset computational task (e.g., the interpolation operation). The execution time of the processing unit k may be inversely proportional to the computational capacity of the processing unit k. If the computational capacity of the processing unit k is higher, the execution time of the processing unit k will be shorter. On the contrary, if the computational capacity of the processing unit k is lower, the execution time of the processing unit k will be longer.

input image and processing unit k, and $M_i[n]$ is the weight corresponding to frame n of the input image and processing unit i.

$$L_k[n] = \frac{M_k[n]}{\sum_{i=1}^{K} M_i[n]} \tag{2}$$

Figure 6:
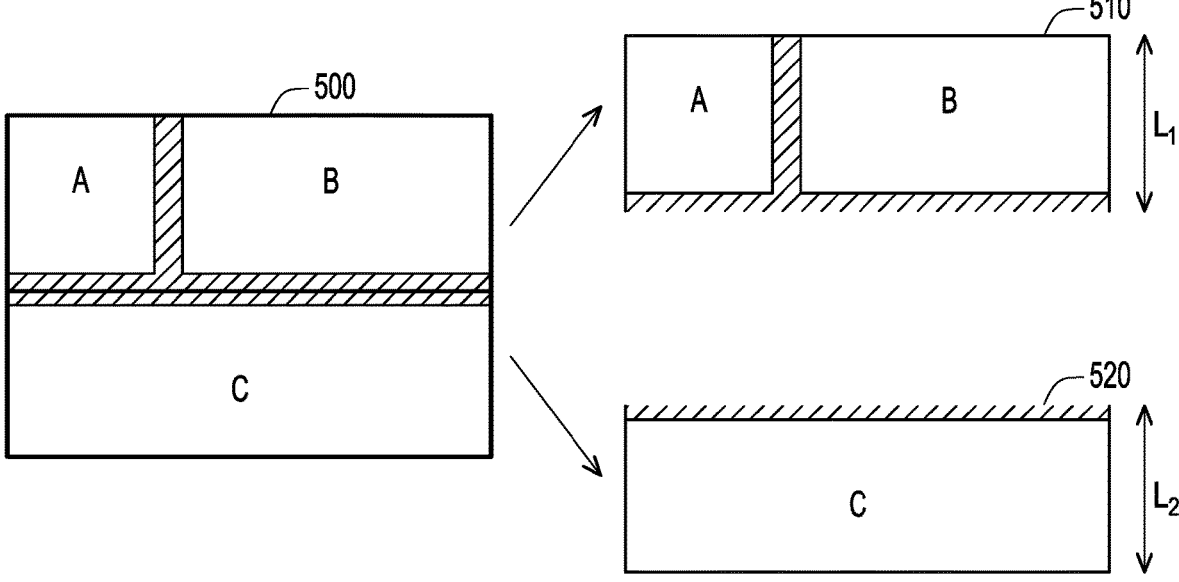
FIG. 6 is a schematic diagram of dividing a layout according to an embodiment of the disclosure.

In step S503, the real-time composer 21 may divide the layout 500 according to the height of the processing unit k to obtain the region of interest corresponding to the processing unit k, and then determine or update the ROI window descriptor. Taking FIG. 6 as an example, the real-time composer 21 may divide the layout 500 according to a height $L_1$ of the processing unit 111 and a height $L_2$ of the processing unit 112 to obtain a region of interest 510 corresponding to the processing unit 111 and a region of interest 520 corresponding to the processing unit 112 respectively. The real-time composer 21 may generate corresponding ROI window descriptors for the region of interest 510 and the region of interest 520 respectively.

Figure 7:
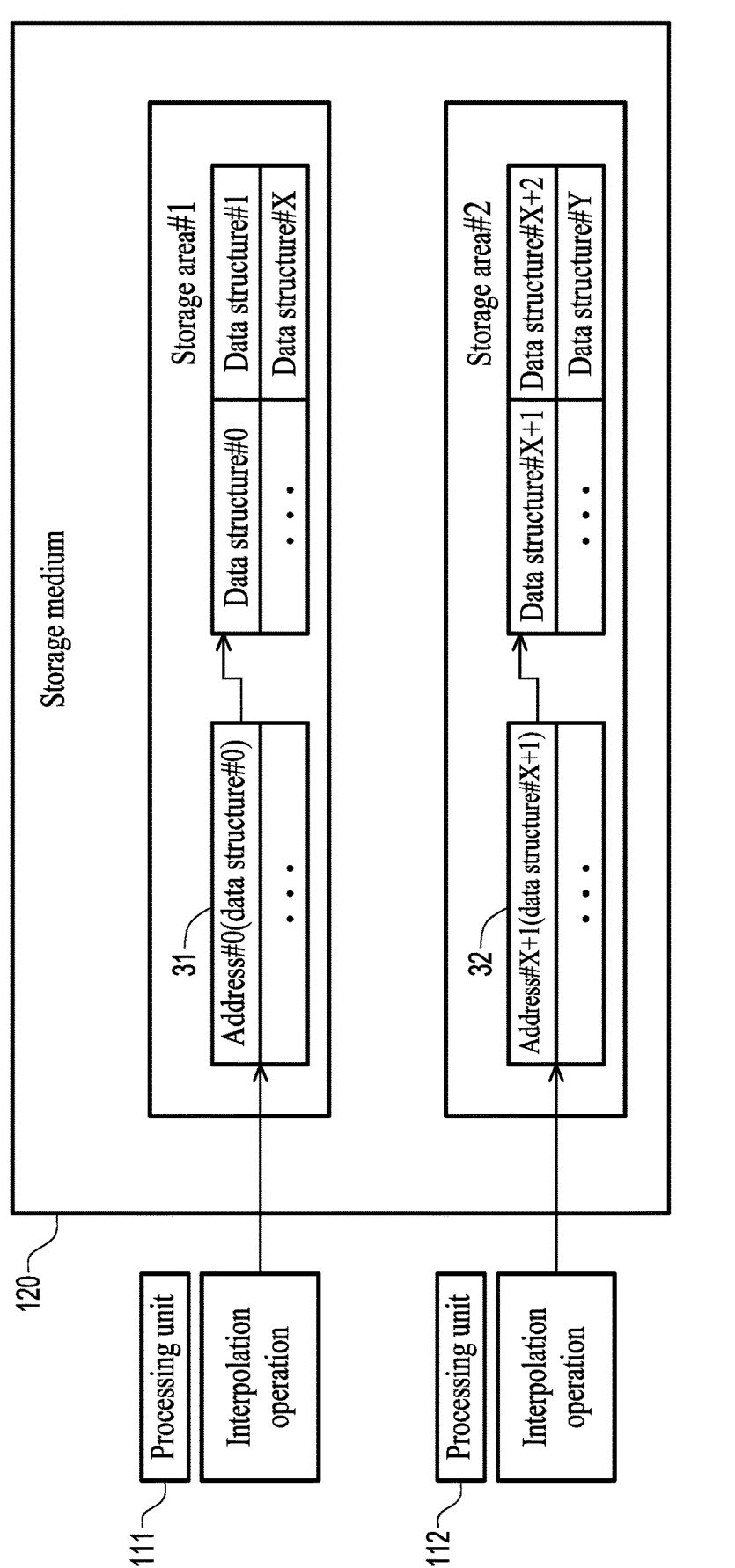
FIG. 7 is a schematic diagram of generating a data structure according to an embodiment of the disclosure.

The real-time composer 21 may obtain the data structure corresponding to the vertex of the region of interest from the vertex list, and perform an interpolation operation according to the existing data structure using the processing unit to generate a data structure corresponding to another vertex of the region of interest. Taking FIG. 7 and FIG. 8 as an example, the processing unit 111 may obtain the correction map 700. The vertex list obtained by the real-time composer 21 may include the data structure of a specific vertex (for example, vertices v0, v1, v2, or v3) in the correction map 700. The processing unit 111 may divide the region of interest 510 into a plurality of tiles including a tile 600. Then, the processing unit 111 may map a sub-block 610 of the tile 600 to the correction map 700 to obtain the mapping area. For example, a vertex on the sub-block 610 may be mapped to the correction map 700 to become a vertex 611. The processing unit 111 may determine which vertices in the mapping area on the correction map 700 are related to the vertex 611, and may perform an interpolation operation according to one or more data structures of one or more vertices related to the vertex 611 to generate a data structure corresponding to the vertex 611. For example, assuming that the vertices v0, v1, v2, and v3 in the mapping area on the correction map 700 are associated with the vertex 611, the processing unit 111 may perform an interpolation operation on the data structure of the vertex v0, the data structure of the vertex v1, the data structure of the vertex v2, and the data structure of the vertex v3 to generate the data structure corresponding to the vertex 611.

In an embodiment, if the vertex 611 in the mapping area is located on the vertex v0 of the correction map 700, the processing unit 111 may determine that the vertex v0 is associated with the vertex 611. In an embodiment, if the vertex 611 is located on the connection line between the two existing vertices (for example, vertices v0 and v1) of the correction map 700, the processing unit 111 may determine that the vertex v0 and the vertex v1 are associated with the vertex 611. In an embodiment, if the vertex 611 is located in the correction map 700, the processing unit 111 may determine that the four existing vertices (i.e., vertices v0, v1, v2, and v3) closest to the vertex 611 on the correction map 700 are associated with the vertex 611.

In an embodiment, the data structure of the vertex of the vertex list corresponding to the region of interest 510 may be stored in a storage area #1 of the storage medium 120. The real-time composer 21 may generate an address table 31 corresponding to the storage area #1, where the address table 31 may record the address pointing to the data structure of the storage area #1. The real-time composer 21 may perform an interpolation operation according to the address table 31 using the processing unit 111 to generate the data structure corresponding to the vertex 611, and store the generated data structure in the storage area #1, thereby updating the address table 31. On the other hand, the data structure of the vertex of the vertex list corresponding to the region of interest 520 may be stored in a storage area #2 of the storage medium 120. The real-time composer 21 may generate an address table 32 corresponding to the storage area #2, where the address table 32 may record the address pointing to the data structure of the storage area #2. The real-time composer 21 may perform an interpolation operation according to the address table 32 using the processing unit 112 to generate a corresponding data structure for the vertex of the region of interest 520, and store the generated data structures in the storage area #2, thereby updating the address table 32.

Figure 9:
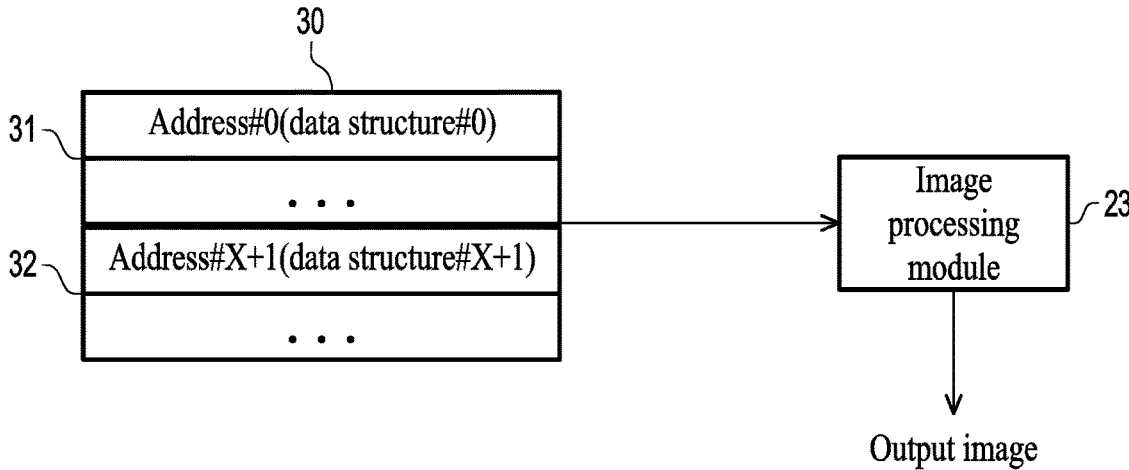
FIG. 9 is a schematic diagram of rendering an output image according to an embodiment of the disclosure.

FIG. 9 is a schematic diagram of rendering an output image according to an embodiment of the disclosure. The real-time composer 21 may combine a plurality of address tables respectively corresponding to a plurality of storage areas, and then update the vertex list to generate the composed vertex list. For example, the real-time composer 21 may combine the address table 31 corresponding to the region of interest 510 (or the storage area #1) and the address table 32 corresponding to the region of interest 520 (or the storage area #2), and then update the vertex list to produce the composed vertex list 30. The image processing module 23 may map the input image to the layout 500 according to the composed vertex list 30 to generate the output image, and may output the output image through the transceiver 130. The US Patent Publication No. "U.S. Pat. No. 10,104, 288" describes a specific implementation of rendering the input image according to the vertex list or the composed vertex list to generate the output image.

Figure 10:
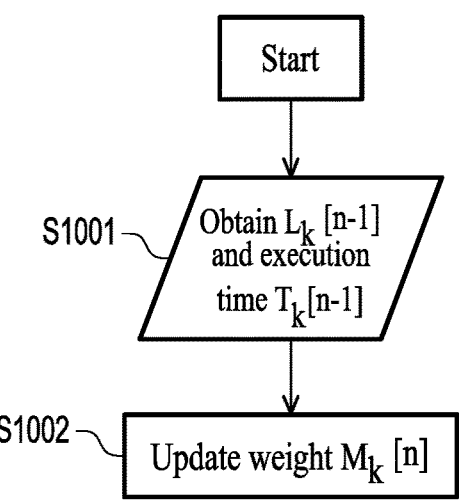
FIG. 10 and FIG. 11 are schematic diagrams of updating weights of a processing unit according to an embodiment of the disclosure.
Figure 11:
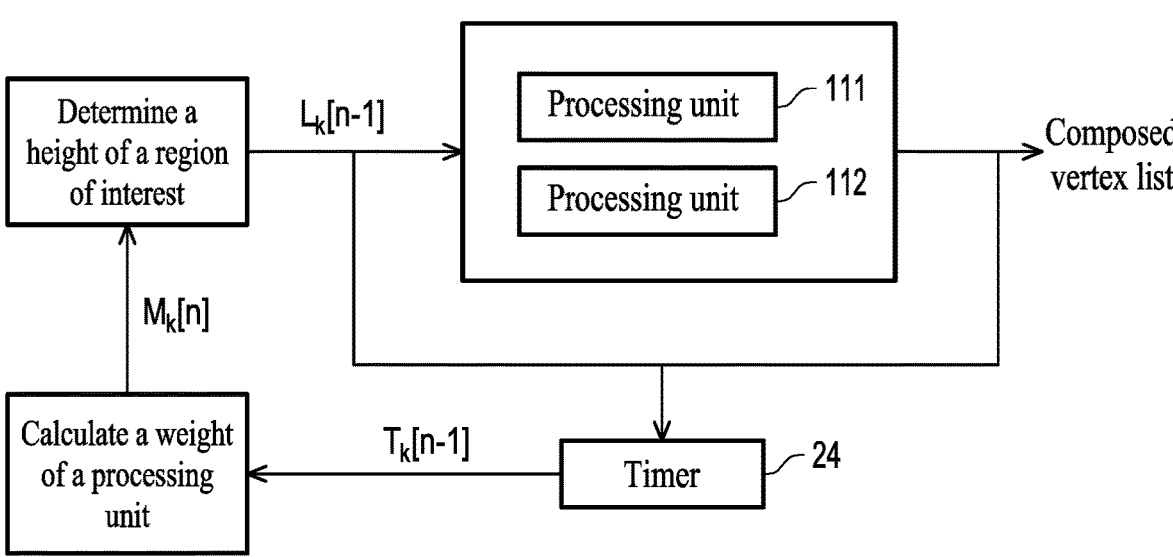

In an embodiment, the real-time composer 21 may dynamically update the weight of the processing unit to process the frame of the input image according to the updated weight. FIG. 10 and FIG. 11 are schematic diagrams of updating a weight of a processing unit according to an embodiment of the disclosure. In step S1001, the real-time composer 21 may obtain a height $L_k[n-1]$ and an execution time $T_k[n-1]$ corresponding to the [n-1]th frame and the processing unit k. Specifically, the plurality of modules stored in the storage medium 120 further include a timer 24. After the processing unit k completes the interpolation operation on the [n-1]th frame of the input image, the real-time composer 21 may record the execution time $T_k[n-1]$ of the interpolation operation through the timer 24.

In step S1002, the real-time composer 21 may update the weight of the processing unit k according to the height $L_k[n-1]$ and the execution time $T_k[n-1]$. The real-time composer 21 may input the ratio of the height $L_k[n-1]$ of the processing unit k to the execution time $T_k[n-1]$ and the weight $M_k[n-1]$ corresponding to the [n-1]th frame of the input image to the infinite impulse response (IIR) filter to update the weight of the processing unit k, as shown in formula (3), where $M_k[n]$ represents the weight of the processing unit k used for the nth frame of the input image, IIR(*) represents the function of the infinite impulse response filter, and $M_k[n-1]$ represents the weight of the processing unit k used for the [n-1]th frame of the input image. The infinite impulse response filter may be configured to smooth the calculation of the weight $M_k[n]$ and avoid the excessive influence of the weight $M_k[n-1]$ on the calculation of the weight $M_k[n]$.

$$M_k[n] = IIR\left(\frac{L_k[n-1]}{T_k[n-1]}, M_k[n-1]\right) \tag{3}$$

FIG. 12 is a flowchart of an image processing method for rendering images according to an embodiment of the disclosure, in which the image processing method may be implemented by the image processing device 100 shown in FIG. 1. In step S1201, the layout information of the output image and the vertex list corresponding to the input image are received. In step S1202, the layout in the layout information is divided according to the first computational capacity of the first processing unit and the second computational capacity of the second processing unit to obtain the first region of interest corresponding to the first processing unit and the second region of interest corresponding to the second processing unit. In step S1203, the first data structure corresponding to the first vertex of the first region of interest and the second data structure corresponding to the second vertex of the second region of interest are obtained from the vertex list. In step S1204, the first interpolation operation is performed according to the first data structure by the first processing unit to generate the third data structure corresponding to the third vertex of the first region of interest. In step S1205, the second interpolation operation is performed according to the second data structure by the second processing unit to generate the fourth data structure corresponding to the fourth vertex of the second region of interest. In step S1206, the vertex list is updated according to the third data structure and the fourth data structure to generate the composed vertex list. In step S1207, the input image is mapped to the layout according to the composed vertex list to generate the output image, and the output image is output.

In summary, the image processing device of the disclosure may determine the weight of the processing unit according to the computational capacity of each processing unit, and divide the region of interest corresponding to the processing unit from the layout for the processing unit according to the weight. According to the data structure of the existing vertex in the vertex list, the processing unit may perform the interpolation operation for the vertex of the tile in the region of interest to generate the data structure corresponding to the vertex, so that the output image may be rendered according to the generated data structure. When processing the current frame of the input image, the image processing device may dynamically update the weight used by the processing unit in the current frame of the input image according to the infinite impulse response filter based on the weight used by the processing unit in the previous frame of the input image, thereby allocating the appropriate workload to each processing unit.

What is claimed is:

1. An image processing device for rendering images, comprising:
   a transceiver, configured to receive layout information of an output image and a vertex list corresponding to an input image;
   a storage medium, configured to store a plurality of modules; and
   a processing device, comprising a first processing unit and a second processing unit, wherein the processing device is coupled to the storage medium and the transceiver, and accesses and executes the plurality of modules, and the plurality of modules comprise:
   a real-time composer, configured to:
      divide a layout in the layout information according to a first computational capacity of the first processing unit and a second computational capacity of the second processing unit to obtain a first region of interest corresponding to the first processing unit and a second region of interest corresponding to the second processing unit;
      obtain a first data structure corresponding to a first vertex of the first region of interest and a second data structure corresponding to a second vertex of the second region of interest from the vertex list;

perform a first interpolation operation according to the first data structure using the first processing unit to generate a third data structure corresponding to a third vertex of the first region of interest;
      perform a second interpolation operation according to the second data structure using the second processing unit to generate a fourth data structure corresponding to a fourth vertex of the second region of interest; and
      update the vertex list according to the third data structure and the fourth data structure to generate a composed vertex list; and
   an image processing module, configured to map the input image to the layout according to the composed vertex list to generate the output image, and output the output image through the transceiver.

2. The image processing device according to claim 1, wherein the real-time composer is further configured to:
   calculate a first weight of the first processing unit and a second weight of the second processing unit according to the first computational capacity and the second computational capacity, wherein the first weight is proportional to the first computational capacity;
   calculate a first height corresponding to the first region of interest according to the first weight and the second weight; and
   divide the layout according to the first height to obtain the first region of interest.

3. The image processing device according to claim 2, wherein the real-time composer is further configured to:
   updated the first weight according to an execution time of the first interpolation operation.

4. The image processing device according to claim 3, wherein the first interpolation operation corresponds to a current frame of the input image, and the real-time composer is further configured to:
   input a ratio of the first height to the execution time and a third weight corresponding to a previous frame of the input image to an infinite impulse response filter to update the first weight, wherein the third weight corresponds to the first processing unit.

5. The image processing device according to claim 1, wherein the real-time composer is further configured to:
   store a plurality of data structures corresponding to a plurality of vertices of the first region of interest in a first storage area of the storage medium, wherein the plurality of data structures comprise the first data structure;
   generate a first address table corresponding to the first storage area; and
   perform the first interpolation operation according to the first address table using the first processing unit to generate the third data structure, and store the third data structure in the first storage area.

6. The image processing device according to claim 5, wherein the real-time composer is further configured to:
   combine the first address table corresponding to the first storage area and a second address table corresponding to a second storage area in the storage medium to generate the composed vertex list, wherein the second storage area corresponds to the second region of interest.

7. The image processing device according to claim 1, wherein the layout information comprises coordinates, a width, and a height corresponding to a region of interest of a source image and comprises coordinates, a width, and a height corresponding to a display area of a target image.

8. The image processing device according to claim 1, wherein the real-time composer is further configured to:

obtain a correction map corresponding to the input image through the transceiver, wherein the vertex list comprises the first vertex on the correction map;

divide the first region of interest into a plurality of tiles comprising a first tile, and map a sub-block of the first tile to the correction map to obtain a mapping area; and in response to the third vertex in the mapping area corresponding to the first vertex, perform the first interpolation operation according to the first data structure to generate the third data structure.

9. An image processing method for rendering images, comprising:

receiving layout information of an output image and a vertex list corresponding to an input image;

dividing a layout in the layout information according to a first computational capacity of a first processing unit and a second computational capacity of a second processing unit to obtain a first region of interest corresponding to the first processing unit and a second region of interest corresponding to the second processing unit;

obtaining a first data structure corresponding to a first vertex of the first region of interest and a second data structure corresponding to a second vertex of the second region of interest from the vertex list;

performing a first interpolation operation according to the first data structure by the first processing unit to generate a third data structure corresponding to a third vertex of the first region of interest;

performing a second interpolation operation according to the second data structure by the second processing unit to generate a fourth data structure corresponding to a fourth vertex of the second region of interest;

updating the vertex list according to the third data structure and the fourth data structure to generate a composed vertex list; and mapping the input image to the layout according to the composed vertex list to generate the output image, and outputting the output image.

\* \* \* \* \*